Oct. 28, 1969
A. G. SWENSON
3,474,552
STEAM IRON VALVE STRUCTURE
Filed June 24, 1968
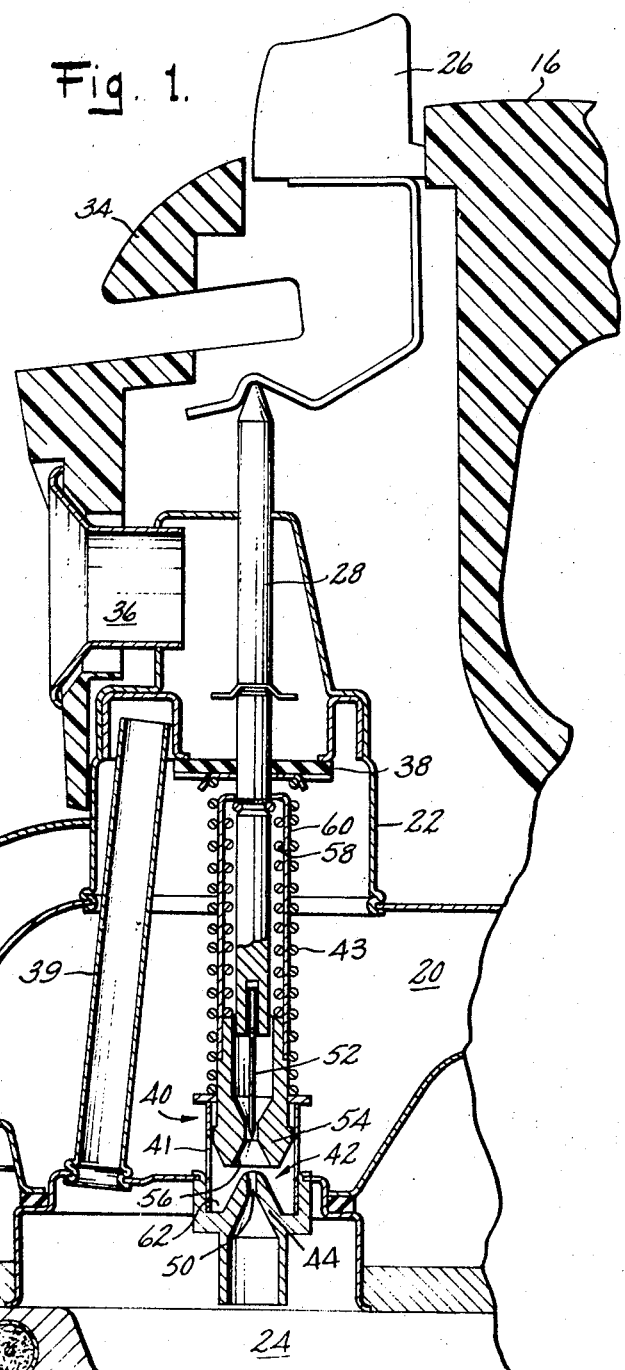
Inventor:
Alfred G. Swenson
by John F. Cullen
Attorney United States Patent Office 3,474,552
Patented Oct. 28, 1969

3,474,552
STEAM IRON VALVE STRUCTURE
Alfred G. Swenson, Ontario, Calif., assignor to General
Electric Company, a corporation of New York
Filed June 24, 1968, Ser. No. 739,238
Int. Cl. D06f 75/10, 75/06, 75/32
U.S. Cl. 38—77                                     6 Claims

ABSTRACT OF THE DISCLOSURE

The invention discloses a steam iron water valve structure to admit feed water into a steam generating cavity. The valve structure adapts the iron for use with any reasonable and impure tap water available. This is achieved by providing an inverted cone with the metering orifice at the top of the cone so that impurities tend to slide down the cone and away from the orifice.

BACKGROUND OF THE INVENTION

Field of the invention

The invention herein pertains to a steam iron and, more particularly, to a novel feed water valve structure between the water tank and the steam generating cavity in the soleplate. The valve uses an inverted cone structure with the metering orifice at the top of the cone to inherently repel flake deposits from the orifice so that tap water of any reasonable locality may be used.

Description of the prior art

With the advent of irons using water for either steam or spray purposes or both, it is customary to provide a water tank in the iron above the soleplate and to use water valve structure to provide controlled water drippage into a steam generating cavity where it is evaporated and directed out steam holes in the soleplate to steam the article. A spray attachment may be added to such irons to supply a fine spray, either manually of power operated, from the water tank to spray onto the garment. Generally it has been preferable to use distilled water in such steam irons because of the fineness of the various water passages and metering orifice which are subject to clogging due to the mineral deposits from the water, which vary from one locality to another. If distilled water is not used, in the hostile hard water localities, the tap water contains minerals which produce loose flakes and deposits that block and plate out on the iron components. These deposits are quite variable from the water in various areas of the country and generally consist of lime or calcium carbonate as well as other chemicals that are in solution in the water or in colloidal suspension. It has been known to provide means for running a clean-out pin through the valve metering orifice by which the water is dripped onto the soleplate in order to unplug any blockage of the orifice. However, removal of the pin permits the blockage to reoccur. Thus, prior art constructions have not provided a design that inherently tends to keep the floating or suspended flakes away from the small feed water orifice and provide a sediment collection area.

SUMMARY OF THE INVENTION

Briefly described, the present invention is directed to a steam iron that has an enclosed water tank and fill opening with a heated soleplate at the bottom onto which water is dripped through an orifice to produce steam in a generator or cavity in the soleplate. An on-off water valve structure is provided to start and stop the water flow from the bottom of the tank to the soleplate cavity through a tubular duct that is connected to direct water from the tank to the soleplate. The particular water valve structure is inherently designed to prevent the collection of flakes at the orifice by providing an upwardly directed dome means in the duct, the dome means having a metering orifice at its apex so any flakes tending to block the orifice inherently are directed down the slanted dome sides and away from the orifice. A piston means, with a clean-out pin cooperable with the orifice, is moveable from open position where water flow is directed through the orifice to closed position blocking the water flow and with the pin projecting through the orifice. For good sealing, the upwardly directed dome means is preferably formed as an inverted cone and the piston means has a cooperating downwardly opening cone to contact and seal around the orifice when the valve is in closed position. Suitable guide means are provided to orient the clean-out pin with the orifice so that upon movement of the valve, the clean-out pin reams the orifice. The guide means is formed by the downwardly opening cone in the piston to center the pin with respect to the orifice, the downward cone thus performing a double function as an alignment or guide means and a sealing means. Additionally, the cone is formed with an annulus around its base to provide a sediment collection area within the water tank that collects lint and other floating debris repelled from the orifice by the novel water valve structure for subsequent removal when the iron is emptied.

BRIEF DESCRIPTION OF THE DRAWING

FIG. 1 is an elevational view, partially in section and broken away, showing general parts of an iron and illustrating one form of the invention; and, FIG. 2 is a partial cross-sectional enlarged view of a modified water valve structure as shown in FIG. 1.

DESCRIPTION OF THE PREFERRED EMBODIMENT

Referring first to FIG. 1, there is shown an electric steam iron that includes a soleplate 10 having a plurality of steam ports 12 and an outer shell 14 being connected in any suitable manner to handle 16 all in known fashion. In accordance with conventional practice, soleplate 10 may be cast from a suitable material such as aluminum with an electrical heating element 18 cast in position. This heating element is of the sheath type and, with the electrical resistance element, extends through an outer tubular protective sheath with the heating element separated from the outer sheath by an insulating compound resistant to heat such as granulated and compressed magnesium oxide. The heating element generally extends in a loop beginning at the rear of the iron and along one side to the forward end and then rearwardly along the other side. Thus, substantially uniform heat distribution is provided when the iron is plugged in and activated.

The iron includes means for generating steam by providing a liquid reservoir generally in the form of a water tank 20 above the soleplate and which has vertical forward portion 22 for housing various operating mechanisms. For steam, soleplate 10 has a steam generator or cavity 24 through which, under control of button 26 and spring biased rod 28, water may be dropped from tank 20 onto the hot soleplate, the resulting steam being distributed through passages 30 under cover 32 and out ports 12 onto the fabric being ironed. Temperature control 34 operates to thermostatically control the heat generated in the soleplate in a known manner. In order to supply water to the tank 20 for steam and/or spray if used, fill opening 36 is provided with direct communication to the tank through a fill valve 38 that is controlled by movement of the steam rod 28. A pressure balance tube 39 equalizes pressure between the soleplate and tank in a known manner. A tubular duct, generally indicated at 40, and of any desirable cross-section is suitably fixed and connected to direct water from the tank 20 to the soleplate 10 and a water valve generally indicated at 42 is disposed in this duct. Duct 40 may be provided with openings 41 for the passage of water from the tank into the duct and thence down to the soleplate, and the upper end of fixed duct 40 may have a base on which spring 43 rests to bias valve 38 closed.

Depending upon the particular design of the iron, the fill opening and control knobs may be in various locations. Generally steam irons of the type described preferably use distilled water for the best operation because of the purity of such water. Many operators simply do not use distilled water but use tap water and in time, depending on the locality, the water passages become clogged. Irons may use a clean-out pin to project through the metering orifice to clean out the orifice accumulations. Generally, the collection area around the orifice has been such that flakes tend to collect because of the cup-shaped structure employed. When the clean-out pin is removed, flakes can funnel into the water orifice and adversely affect the operation of the orifice. Typical structure is shown in U.S. Patent 3,041,756 of common assignment. The present invention is designed to improve on the water valve structure heretofore used.

To prevent the accumulation of deposits at the metering orifice of the water valve 42, located at the bottom of rod 28, an inverted or upwardly directed dome means 44 is provided which is preferably a circular cone as shown and may be fixed substantially in the bottom wall of tank 20. For metering or controlling the water flow, orifice 50 is formed in the top of dome means 44. It will readily be seen that the slanted sides of the upward cone 44 inherently tend to float away or repel any flakes or deposits in the water and thus carry them away from the orifice. However, since flakes can deposit directly on the orifice, it is desired to prevent this as much as possible and to this end the clean-out pin 52 is actuated by rod 28 into the orifice in valve-off or closed position. Pin 52 may be moveable relative to rod 28 as shown or may be a direct known connection.

In order to seal orifice 50 in the valve-off position, a moveable member such as piston 54 is provided. Guide means for pin 52 are required to ensure entry into orifice 50 and, to this end, piston 54 is formed with a downwardly opening cone 56 that contacts and seals around orifice 50 in upward cone 44. It will readily be seen that closing of piston 54 on cone 44 this performs the dual function of sealing orifice 50 to prevent further steam generation as well as guiding by aligning or orienting clean-out pin 52 with respect to orifice 50. Movement of pin 52 relative to rod 28 puts the pin 52 in orifice 50. Piston 54 is biased by spring 58 bearing against bracket 60 on rod 28 and the piston 54 may be press fitted in bracket 60. Any suitable linkage may be used to move and bias rod 28 and that shown and described is merely illustrative.

In order to collect the repelled flakes and other debris in a convenient collection area for subsequent draining, the upwardly directed cone 44 provides an annulus 62 that acts as a sediment collection area within tank 20. Additionally, it provides an area into which the downward cone of piston 54 may project in valve-off or closed position.

Referring next to FIG. 2, a sheet metal construction is shown and like numerals refer to like parts. In this modification, the upward dome means 64 with its orifice 66 is stamped out of sheet metal to simplify the construction at lower cost. The remaining elements operate the same as described in connection with FIG. 1.

It will be seen that the novel inverted or upwardly directed domed water valve means containing the orifice inherently tends to repel, along its slanted sides, any flakes that may block the orifice while providing an excellent sealing surface formed directly in the moveable piston portion of the valve. The same structure also provides a convenient guiding means to orient the clean-out pin when the orifice in a valve-closed position. All portions may be conveniently cylindrical but are not so limited.

While there have been shown preferred forms of the invention, obvious equivalent variations are possible in light of the above teachings.

I claim:

1. In a steam iron having an enclosed water tank with a fill opening thereto and a heated soleplate with a steam generating cavity, an on-off water valve structure controlling water flow to said cavity to generate steam comprising, a tubular duct connected to direct water from the tank to the soleplate, upwardly directed dome means in said duct and having a metering orifice at the apex thereof, piston means having a clean-out pin cooperable with said orifice and moveable from open position of water flow through said orifice to closed position blocking water flow with said pin projecting through said orifice, and guide means orienting said pin with said orifice.

2. Apparatus as described in claim 1 wherein said upwardly directed dome means is a circular cone and said orifice is circular.

3. Apparatus as described in claim 1 wherein said orifice is fixedly disposed substantially in the bottom wall of said tank.

4. Apparatus as described in claim 2 wherein said piston means is formed as a downwardly opening cone to contact and seal around said orifice in valve-off position to guide said pin.

5. Apparatus as described in claim 2 wherein said upward cone has an annulus formed around its base providing a sediment collection area within said tank.

6. Apparatus as described in claim 4 wherein said upward cone has an annulus formed around its base providing a sediment collection area within said tank and said downward cone projects toward said annulus in valve closed position.

References Cited

UNITED STATES PATENTS

| 2,782,537 | 2/1957 | Vera-Mege | 38—77 |
| 2,887,799 | 5/1959 | Kuhn et al. | 38—77 |

PATRICK D. LAWSON, Primary Examiner